Feb. 17, 1931.   F. BURCH   1,793,421
SPRING CONSTRUCTION
Filed April 10, 1929   2 Sheets-Sheet 1
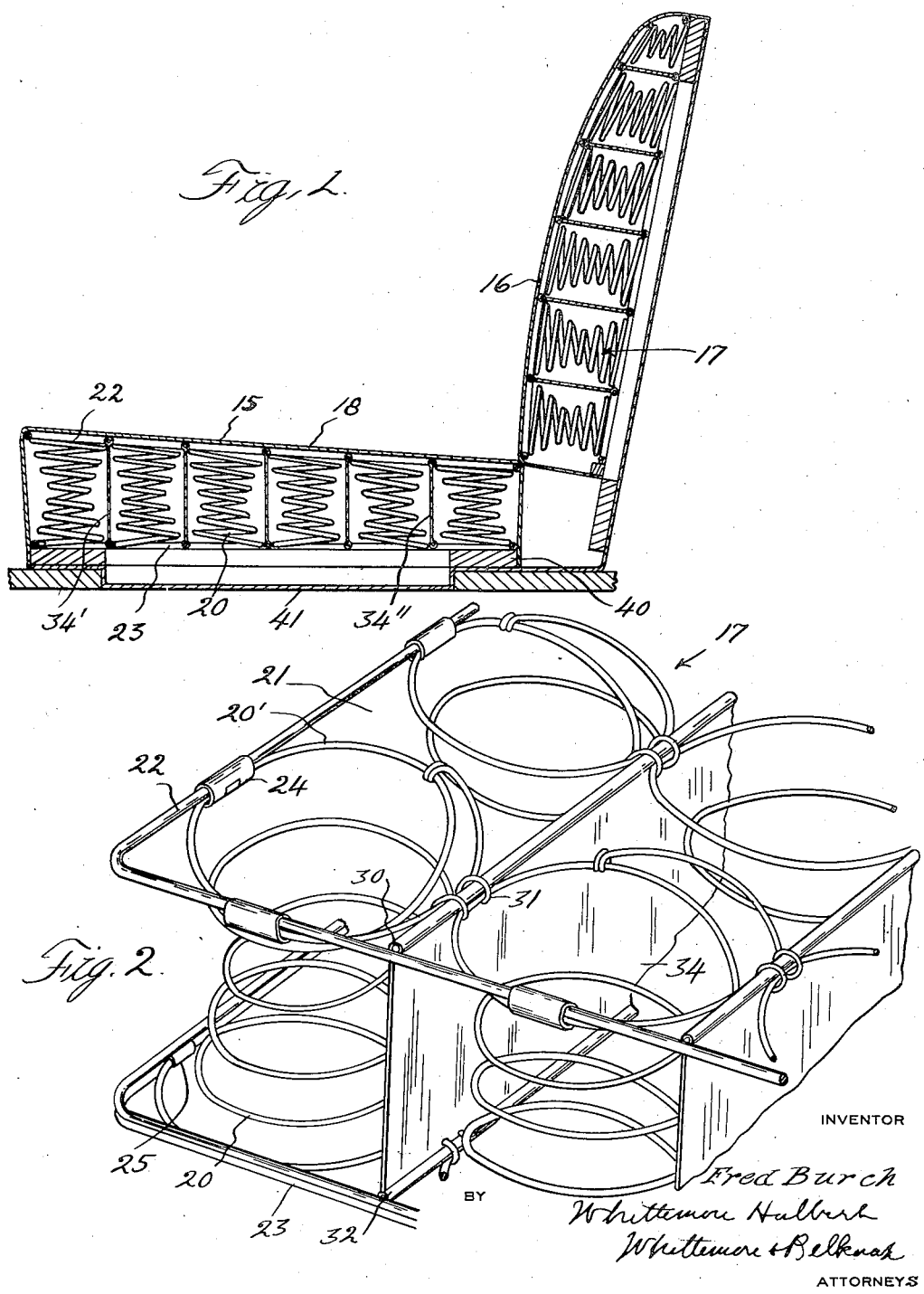

Feb. 17, 1931.   F. BURCH   1,793,421
SPRING CONSTRUCTION
Filed April 10, 1929   2 Sheets-Sheet 2
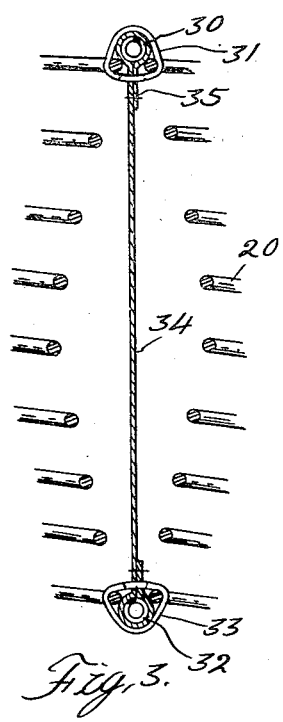
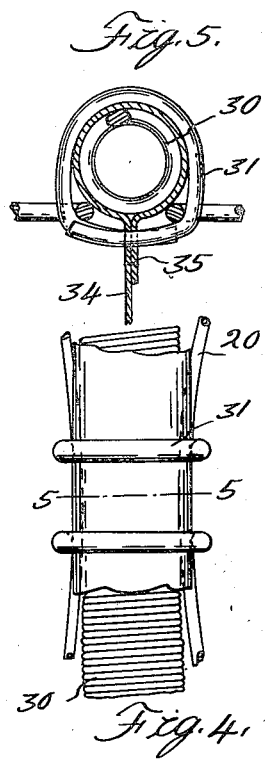
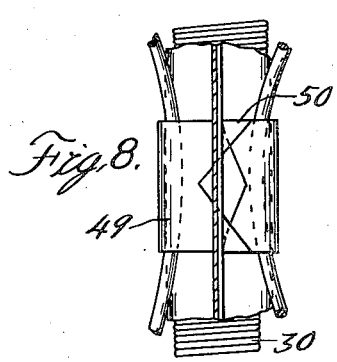
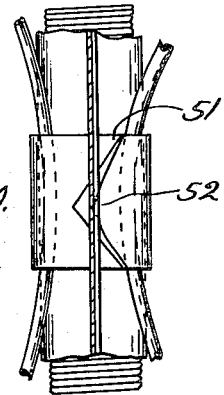
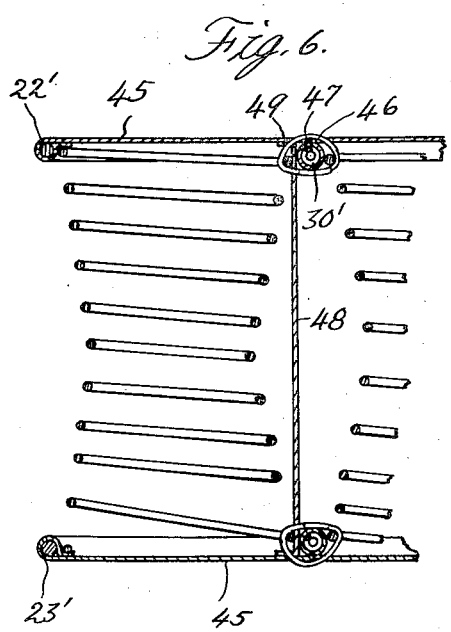
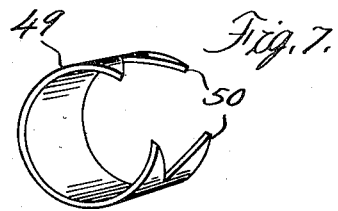
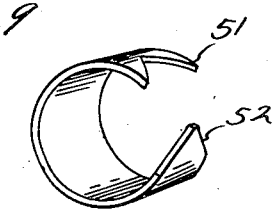
INVENTOR
Fred Burch
BY Whittemore Hulbert
Whittemore & Belknap
ATTORNEYS Patented Feb. 17, 1931

1,793,421

UNITED STATES PATENT OFFICE

FRED BURCH, OF MILFORD, MICHIGAN

SPRING CONSTRUCTION

Application filed April 10, 1929. Serial No. 354,101.

This invention relates to spring constructions and has particular reference to a spring construction of the character utilized in the cushions and backs of vehicle seats, in mattresses and in upholstered furniture.

One of the primary objects of this invention is to provide a spring construction in which a plurality of individual springs are grouped to form a unit of the shape and size desired and to provide means for rigidly securing the individual springs against lateral movement while permitting up and down movement of the springs to give the unit the desired resiliency.

A still further object of the invention is to provide a spring unit formed of a plurality of individual springs and to provide means for maintaining the said springs under compression whereby the thickness of the unit may be reduced without reducing the resiliency of the same and whereby various contours may be given to the unit by variably compressing the different individual springs.

A still further object of the invention is to provide a spring unit which may be entirely free from braces or the like thus being substantially noiseless while still possessing the desired rigidity to withstand the use to which the same is subjected.

Other objects and advantages of the invention will become more apparent as the following description proceeds, particularly when reference is had to the accompanying drawings, wherein:

Figure 1 is a sectional view through a vehicle seat, showing a spring unit constructed in accordance with the teachings of this invention applied to the same;

Figure 2 is a fragmentary perspective view of the spring unit shown in Figure 1;

Figure 3 is a fragmentary vertical sectional view through the unit shown in Figure 2;

Figure 4 is a fragmentary plan view of a portion of the unit;

Figure 5 is a sectional view taken on the line 5—5 of Figure 4;

Figure 6 is a fragmentary sectional view showing a slightly modified form of construction;

Figure 7 is a perspective view of a slightly modified form of clip which may be used in assembling the spring unit;

Figure 8 is an elevational view of a portion of a spring unit showing the clip disclosed in Figure 7 applied to the same;

Figure 9 is a view similar to Figure 7 of a further modified form of clip, and

Figure 10 is a view similar to Figure 8 showing a clip such as disclosed in Figure 9 applied to a spring unit.

Referring now particularly to the drawings wherein like reference characters designate corresponding parts throughout all views, there is illustrated in Figure 1 a vehicle seat having the seat cushion 15 and the back cushion 16. Each cushion includes a spring unit 17, constructed in a manner which will hereinafter be more fully brought out, and each unit may be covered by the trimming or upholstering 18 in accordance with the usual practice. The back and seat cushions may be made separate as illustrated or may, if desired, be formed as a single unit as will be readily apparent.

Each spring unit comprises a plurality of coil springs 20, grouped to form a unit of the desired size and shape. The coils may be of any diameter and may be of any size and may vary in diameter as illustrated, dependent entirely upon the type of spring which it is desired to use.

The springs 20 may preferably be arranged in rows 21, the rows being laterally spaced from each other and the springs in each row being spaced from each other longitudinally of the row. The rows of springs are preferably surrounded by an upper border member 22 and a lower border member 23 and these members may be of any desired character. For example the upper border member 22 may be in the form of a metallic rod while the lower border member 23 may, if desired, be in the form of a channel member. The springs 20' on the edge of the assembly may be secured to the upper border member by the clip members 24 and may be secured to the lower border member 23 by bending in portions of the legs of the channel member as indicated at 25, Arranged between the rows of springs at the top of the unit are flexible cables 30 which as illustrated in Figure 4 of the drawings may be conveniently formed of a spring wire coil. Thus, as illustrated the cables 30 are arranged on opposite sides of each spring 20 except those springs which define the border of the unit, the border member 22 being substituted for the cable on the outside of these springs. Further, the cables 30 are arranged adjacent the upper edges of the springs 20 and the uppermost convolution of each spring is rigidly secured at its opposite sides to its respective cables by the clips 31.

As illustrated in Figures 3 to 5 inclusive, each clip 31 is preferably in the form of a strip of heavy wire initially bent to a substantial C shape. The C shaped clip is slipped over the cable 30 and around the top convolutions of the adjacent springs after which it is bent so that its free edges overlap in the manner shown in Figure 5 of the drawing. When the wire 31 is clamped tightly about the cable, it will be forced partially between the convolutions of the cable thus locking the wire against movement longitudinally of the cable.

Corresponding cables 32 are arranged between the rows of springs at the bottom of the unit and the ends of these cables, may, if desired project into the channel of the channel border member 23. The lowermost convolution of each spring is clipped to two of the cables 32 by clips 33, similar to the clips 31. Thus, each spring member 20 is rigidly secured at four points to the adjacent cables 30 and 32 and this rigid attachment of the springs to the cables prevents lateral movement of the springs relative to each other.

The invention further contemplates the provision of means for normally holding each spring 20 partially compressed. To accomplish this each cable 30 is connected to its corresponding cable 32 by a listing or separator 34 which may, as illustrated, be formed of cloth such as burlap. In securing these listings to the cables, the corresponding cables on opposite sides of the unit are drawn toward each other so that the springs secured to these cables are compressed. Thus, the width of the listing determines the degree of compression of the springs 20 and if desired certain of the listings or certain portions of each listing may be varied in width to correspondingly vary the degree of compression of the associated springs.

When the listings are made of cloth they are looped around the upper and lower cables and sewed as at 35, thus forming tie members to limit the movement of the cables away from each other. It is preferable to make each listing slightly longer than its respective cable so that there will be a certain fullness in the length of the listing to permit the springs to be compressed without unduly straining the listing throughout its entire length. In a relatively thick unit the listings will be shirred on the cables to provide a greater fullness for the increased compression incident to the longer springs used. Obviously, the listings may be made of any desired width depending upon the maximum distance it is desired that each upper cable be spaced from the lower cable.

A spring unit constructed as above described possesses numerous advantages. The springs being secured at their ends and at their opposite sides to the cables, will be firmly held against lateral movement relative to each other. The entire assembly will be sufficiently rigid to prevent bowing under the strain of the trimming or upholstering without the assistance of struts or braces of any character. Thus, the braces and struts usually associated with spring units of this character may be dispensed with, with the result that the springs may expand and contract without hindrance and the entire unit will be substantially noiseless.

Further, the resiliency of the unit may be varied between wide ranges by changing the diameter of the wire of the springs 20 or the pitch of the coil and also varying the compression of the springs by the listings. Thus, a relatively large spring may be compressed to a greater degree with the result that the larger spring takes up very little more room and yet gives to the unit greater resiliency.

Although the springs are held from lateral movement relative to each other, they may expand and contract within the limits maintained by the listings. The springs being held partially compressed will not rebound to a great extent thus giving greater riding comfort. Still further, the springs may move up and down with considerable freedom and the movement of one spring will not be transmitted to the adjacent springs to any great degree so that when two persons differing greatly in weight occupy the same seat, the springs will readily adjust themselves to the respective weights without changing the contour of the entire spring unit.

As illustrated in Figure 1 of the drawing, the listings 34 may be varied in width to vary the contour of the spring unit. Thus, in a seat cushion the forward listings 34' may be relatively wide while the listings 34" adjacent the rear of the cushion may be relatively narrow to thus cause the spring unit and the cushion to slope rearwardly. Obviously, various contours may be given to the spring unit by properly varying the width of the listings at the points desired.

A further feature of the present construction which renders the same particularly applicable to the construction of automobile seat cushions resides in the fact that the bottom of the spring unit may be made resilient in the manner illustrated. The present tendency in the manufacture of automobile bodies is to make the bodies as low as possible, limiting the room between the ceiling and the seat bottom, and thus limiting the height of the cushion spring. Heretofore it has been customary to make the bottoms of the spring units rigid and where the cushions have been supported on the body sills 40, such as shown in Figure 1 of the drawing, the manufacturers have provided a pan 41 which drops below the sills and have shaped the bottom of the cushion to cause the same to drop into this pan so that the springs may be made of the desired size. By virtue of the present construction, however, the bottom of the spring unit may be made flat since the resiliency of the bottom cables will permit the springs positioned over the pan 41 to move downwardly into this pan under the force of a weight placed on the top of the spring unit. Thus, the desired resiliency may be obtained without the expense of providing offset portions in the bottom of the spring unit.

Obviously, however, the bottom of the spring unit might be made rigid if desired without departing from the spirit of the inventive idea and in such a construction the top cables 30 only would be flexible, the listings being secured at their lower edges to rigid cross members. Further, the listings might be formed of cloth sewed as illustrated or secured around the cables in any other desired manner and it will also be obvious that the listings might if desired be formed in numerous ways other than as the long strips of cloth such as illustrated.

In Figure 6 a slightly modified form of construction is disclosed. In this form of construction cloth covers 45 are provided, one of these covers being secured to the border members 22' and being extended over the top of the spring unit and the other of these covers being secured to the border members 23' and being extended over the bottom of the unit. The cloth covers extend over the tops and bottoms of all of the springs and all of the cables and at each cable each cover is looped backwardly as at 46 to surround the cable 30' and is then sewed as at 47 so that each cable is entirely enclosed in a pocket extending longitudinally of its adjacent cover. The listings 48 are then sewed directly to the cloth covers as indicated at 49, the cloth covers being drawn toward each other to correspondingly draw the cables toward each other and to compress the springs which are secured to the cables by clips similar to those disclosed in Figure 5 of the drawing. While the clips are disclosed as being extended through the top convolutions of the springs and through the listings, it will be readily apparent that the listings might be arranged in any desired relation to the cables 30' so that it would not be necessary to extend the clips through the listings. It will also be apparent that in place of the covers 45 entirely covering the top and bottom of the unit, strips of cloth might be provided which might be secured to the border members and extended over the centers of the rows of springs. If strips of cloth are used in place of complete covers, the listings may be secured to these strips in the same manner as the listings 48 are secured to the covers 45.

In Figure 7 a slightly modified form of clip is disclosed to take the place of the clips 31 and 33. This clip 49 comprises a flat strip of metal cut at its ends to form the prongs 50 and initially bent to a C shape as illustrated. In use this clip is wrapped around one of the cables 30 as clearly illustrated in Figure 8 of the drawing to secure the end convolution of the adjacent spring to the cable. The prongs 50 may be bent upwardly as illustrated at 51 to bite into the cable to prevent sliding of the clip longitudinally of the cable.

In Figure 9 a further modified form of clip is shown in which a strip of metal is cut to form the prongs 51 at one end and a single prong 52 at its other end. In use this clip is bent around the cable 30 in the manner illustrated in Figure 10 of the drawing to secure the end convolution of the adjacent spring to the cable. The prongs 51 and 52 may be bent to impinge on the cable in the same manner as the prongs 50 to prevent sliding of the clip longitudinally of the cable.

Regardless of the type of clip used and regardless also of the particular manner of securing the listings in position, it will be apparent from the above that the invention provides means for rigidly securing a plurality of coil springs in assembled position to form a spring unit. The springs will be held against lateral movement relative to each other but will be permitted to move up and down to give the desired resiliency to the unit. The springs will be held slightly compressed to decrease the rebound of the spring unit and to provide for the use of large springs possessing great resiliency in a relatively small unit. The spring unit disclosed may be utilized in a mattress, in upholstered furniture or in any construction wherein spring units of the general character disclosed are required.

While the invention has been described with considerable detail, it is clearly understood that the description is for the purpose of illustration only. The right is therefore reserved to make such changes in the details of construction and arangement of parts as will fall within the purview of the attached claims.

What I claim as my invention is:

1. In a spring construction, a plurality of coil springs arranged in a row, a longitudinally extensible member connected to said springs at the top ends thereof and resiliently connecting adjacent springs of said row, and means including a listing strip for holding said springs under compression, said listing strip being connected to said extensible member and permitting limited extension thereof.

2. In a spring construction, a plurality of coil springs arranged in a row, a resilient longitudinally extensible member connected to the springs of said row at the top ends thereof to resiliently connect adjacent springs, and means including a listing strip for holding said springs under compression, said listing strip being provided with a hem at the upper edge thereof through which said resilient extensible member extends to connect said listing strip to said member, said listing permitting extension of said extensible member.

3. In a spring construction, a plurality of coil springs arranged in transverse and longitudinal rows, longitudinally extensible members connected to said springs at the top ends thereof and resiliently connecting adjacent springs in said longitudinal rows, and means including listing strips for holding said springs under compression and extending between adjacent springs, said listing strips also being connected to said extensible members and permitting extension thereof.

4. In a spring construction, a plurality of coil springs arranged in rows, longitudinally extensible members resiliently connecting adjacent springs of said rows, and means including listing strips acting to hold said springs under compression, said strips being shirred on said extensible members so as to provide a fullness between adjacent springs to permit a limited extension of said extensible member.

5. In a spring construction, a plurality of coil springs arranged in longitudinal rows, extensible members resiliently connecting adjacent springs of said rows, and means including a listing strip for each row acting to hold the springs thereof under compression, said strip being secured to said springs at the juncture of said extensible member and springs, and being shirred on said extensible member so as to provide a fullness between adjacent springs to permit a limited extension of said extensible member.

6. In a spring construction, a plurality of coil springs arranged in a row, a longitudinally extensible member connected to the springs at the top ends thereof and resiliently connecting the adjacent springs of said row, and means including a listing strip for holding said springs under compression, said listing strip being connected to said extensible member and spring at the juncture thereof and permitting extension of said extensible member between adjacent springs, said extensible member constituting a reinforcement for the connection between the listing strip and springs.

7. A spring construction including in combination upper and lower border frames, a plurality of coil springs arranged in rows within said border frames, lower members extending between rows of said springs at the bottom thereof and connected to the bottom frame member, longitudinally extensible members arranged between the rows of said springs at the tops thereof and resiliently connecting adjacent springs of said rows, said extensible members being in substantial parallelism with the said lower members, and listings extending between adjacent springs and connecting corresponding extensible members and lower members to each other for holding said springs under compression while permitting extension of said extensible members.

8. In a spring construction, a plurality of coil springs arranged in a row, longitudinal extensible members connected to said springs at the top and bottom ends thereof and resiliently connecting adjacent springs of said row, and means including a listing strip for holding said springs under compression, said listing strip being connected to said extensible members and permitting limited extension thereof.

9. A spring construction including in combination upper and lower border frames, a plurality of coil springs arranged in rows within said border frames, lower members extending between rows of said springs at the bottom thereof and connected to the bottom frame member, longitudinally extensible members arranged between the rows of said springs at the tops thereof and resiliently connecting adjacent springs of said rows, said extensible members being in substantial parallelism with the said lower members, and listings extending between adjacent springs and connecting corresponding extensible members and lower members to each other for holding said springs under compression while permitting extension of said extensible members, said listings being of different widths to vary the contour of said spring construction.

10. In a spring construction, a plurality of coil springs arranged in a row, a resilient longitudinally extensible coil spring arranged longitudinally of said row and connected to the springs of said row at the top ends thereof to resiliently connect adjacent springs, and means including a listing strip for holding said springs of the row under compression, said listing strip extending longitudinally of said row of springs and being provided with a hem at the upper edge thereof through which said longitudinally arranged coil spring extends to connect said listing strip to said longitudinally arranged coil spring, said listing strip permitting extension of said longitudinally arranged coil spring.

11. A spring cushion comprising a plurality of coil springs arranged in rows transversely and longitudinally of the cushion, resilient longitudinally extensible coil springs extending longitudinally of said cushion between adjacent rows of springs, clips connecting the tops of the coil springs of said longitudinal rows to said longitudinally extensible coil springs whereby the latter resiliently connect adjacent springs of said rows, and means including listing strips extending longitudinally of said cushion between adjacent longitudinal rows of springs for holding said springs of said rows under compression, said listing strips being provided with hems at the upper edges thereof through which said longitudinally extensible coil springs extend, said clips serving also to connect said listing strips to the coil springs of said rows, said listing strips being shirred on said longitudinally extensible coil springs between adjacent coil springs of said rows to provide for extension of said longitudinally extensible coil springs.

In testimony whereof I affix my signature.

FRED BURCH.